UNITED STATES PATENT OFFICE.

CHARLES MOTIER NES, OF YORK, PENNSYLVANIA.

IMPROVEMENT IN THE MANUFACTURE OF CAST-STEEL IN CRUCIBLES.

Specification forming part of Letters Patent No. 121,889, dated December 12, 1871; reissue No. 4,727, dated January 30, 1872.

*To all whom it may concern:*

Be it known that I, CHARLES MOTIER NES, of York, in the county of York and State of Pennsylvania, have invented certain new and useful Improvements in the Manufacture of Steel, of which the following is a specification:

My present invention is directed to the production of an improved steel from wrought-iron. The invention is based upon the employment of a magnetic silicide of iron-ore, sometimes known as "Codorus ore," whose properties and the localities where it may be found are fully set forth in Letters Patent heretofore granted me for improvements in the manufacture of iron and steel, which ore, by being mingled with the iron in a crucible, will, if proper treatment be observed, convert the wrought metal into an improved steel.

The manner in which I carry my invention into effect is as follows: I employ a crucible of ordinary construction, made of plumbago and other ingredients, like those used for making ordinary cast-steel.

In making steel from wrought-iron, such as old horseshoes, scrap, &c., I cut up the old iron, horseshoes, or any other suitable wrought-iron with ordinary shears, such as used for cutting up iron in the ordinary manufacture of the same into cast-steel. I then fill the crucible with the scrap or pieces of wrought-iron and with the ore above specified, in the proportion of one hundred pounds of wrought metal to from one-quarter of a pound to five pounds of ore. These proportions may be varied; but I find the best results attained within the limits specified. Charcoal, in quantity from one to ten ounces, may be added or not to the charge, as preferred. I then place the crucible, covered in the usual way, in an ordinary furnace for making cast-steel, and melt and thoroughly boil together the iron and ore, which operation will take, say, three or four hours. I then take out the crucible and pour the melted steel into molds of any desired shape. The charcoal is added in case I desire to have a hard steel, the carbon in the charcoal making it harder, while the silicon in the ore gives it at the same time toughness and tenacity.

I find that old horseshoes may be readily and quickly reworked in the manner above described, and the process may be very economically conducted with them, although, of course, it is applicable to all wrought-iron.

By this process I am enabled to make a steel which is unlike ordinary cast-steel, from the fact that it will weld onto itself, which ordinary cast-steel will not do; is softer, more malleable, and tougher, and will bear a higher heat. The purifying effects of the ore on the horseshoes, iron, &c., causes the steel to be entirely free from the deleterious properties which ordinarily produce non-uniformity and bad steel.

Having described my invention and the manner in which the same is or may be carried into effect, what I claim, and desire to secure by Letters Patent, is—

The manufacture of steel from old horseshoes or other wrought-iron and the ore herein specified in a crucible, substantially as set forth.

In testimony whereof I have signed my name to this specification before two subscribing witnesses.

CHARLES M. NES.

Witnesses:
M. BAILEY,
C. B. NOTTINGHAM.